United States Patent [19]

Reed

[11] 3,996,847
[45] Dec. 14, 1976

[54] APPARATUS FOR HEATING FOOD PRODUCTS
[75] Inventor: Claude A. Reed, Omaha, Nebr.
[73] Assignee: Reed Development, Inc., Omaha, Nebr.
[22] Filed: Feb. 28, 1974
[21] Appl. No.: 446,951

Related U.S. Application Data
[63] Continuation-in-part of Ser. No. 190,254, Oct. 18, 1971, abandoned.
[52] U.S. Cl. .................................. 99/419; 99/485
[51] Int. Cl.² ....................................... A47J 37/06
[58] Field of Search ............ 99/386, 352, 385, 387, 99/401, 419–420, 421 TP, 485; 165/185

[56] References Cited
UNITED STATES PATENTS

| | | | |
|---|---|---|---|
| 15,799 | 9/1856 | Bennett | 99/419 |
| 267,535 | 11/1882 | Hurd | 99/419 X |
| 995,270 | 6/1911 | McCaughey | 99/419 X |
| 2,199,303 | 4/1940 | Damon | 99/419 |
| 2,411,345 | 11/1946 | Suttles | 99/419 X |
| 2,423,963 | 7/1947 | Coffman | 99/352 X |
| 2,483,546 | 10/1949 | Kaminski | 99/419 UX |
| 3,709,141 | 1/1973 | Schwartzstein | 99/421 TP X |
| 3,736,859 | 6/1973 | Carlson | 99/352 X |

Primary Examiner—Leonard D. Christian
Assistant Examiner—Arthur O. Henderson
Attorney, Agent, or Firm—Henry L. Brinks; Peter E. Heuser

[57] ABSTRACT

Food products, for example, hamburger patties, are rapidly cooked with reduced weight losses. A cooking appliance is provided having a plurality of parallely spaced heat transfer fins from which project an array of cooking grills on which the hamburger patty is impaled. The appliance is adapted to be passed through a cooking environment so that heat is transferred through the fins and projecting grills to the interior of the hamburger patty. In this way cooking is accomplished in a relatively short period of time, and also the amount of fat and meat juices that are melted or broiled away is minimized. A device with a handle is provided for releasably engaging the cooking appliance so that the appliance can be conveniently moved even if hot. The device is provided with an ejection system for discharging the hamburger patty from the appliance.

10 Claims, 16 Drawing Figures

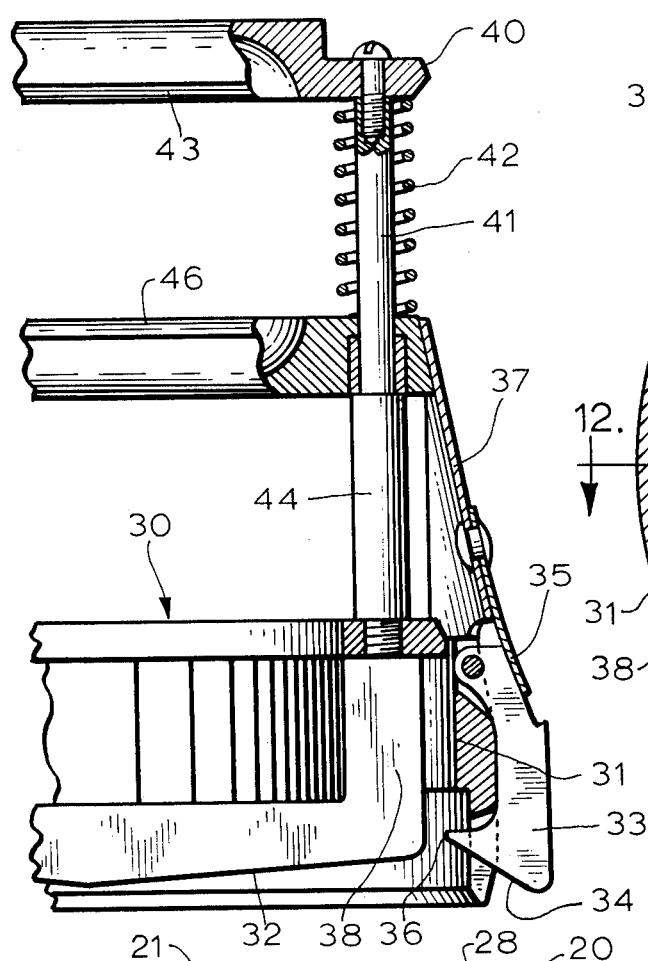
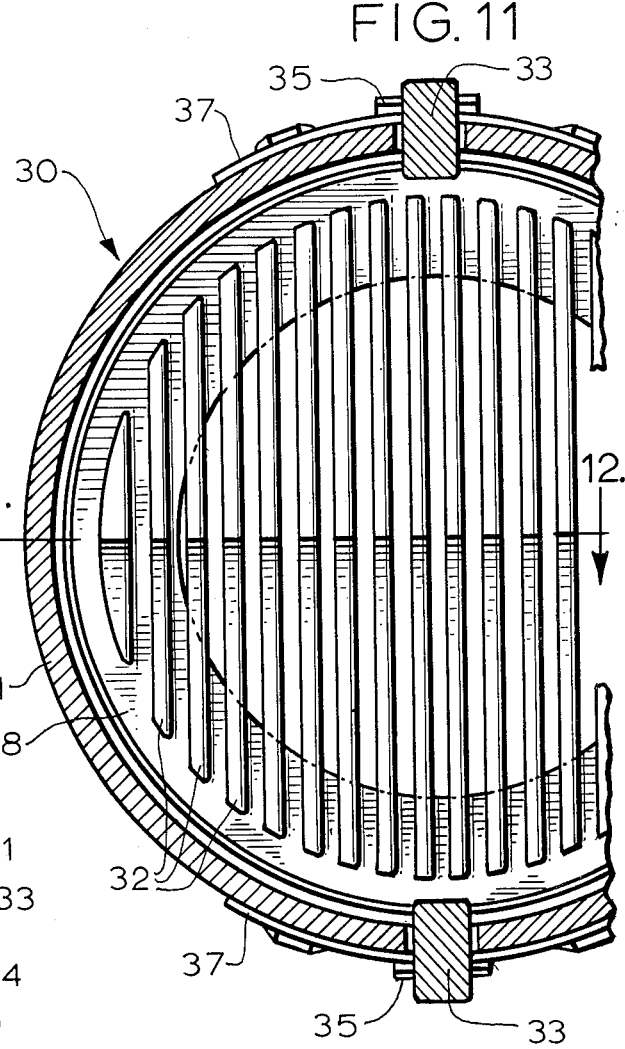
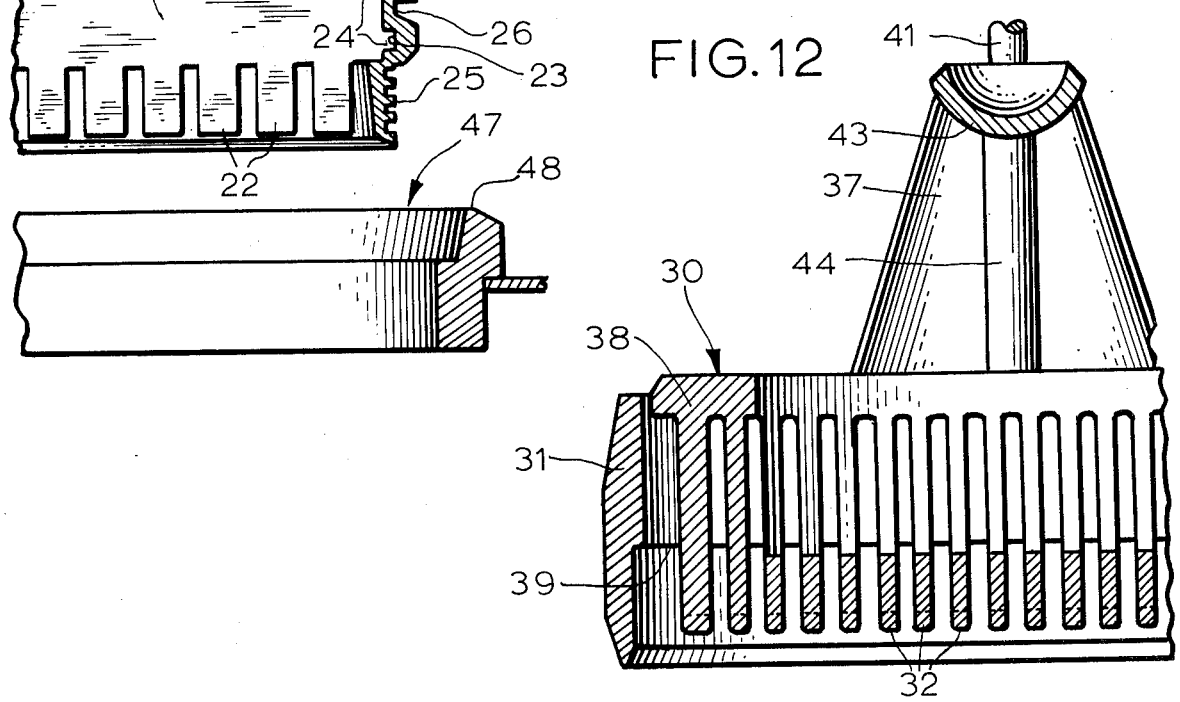
FIG. 10
FIG. 11
FIG. 12

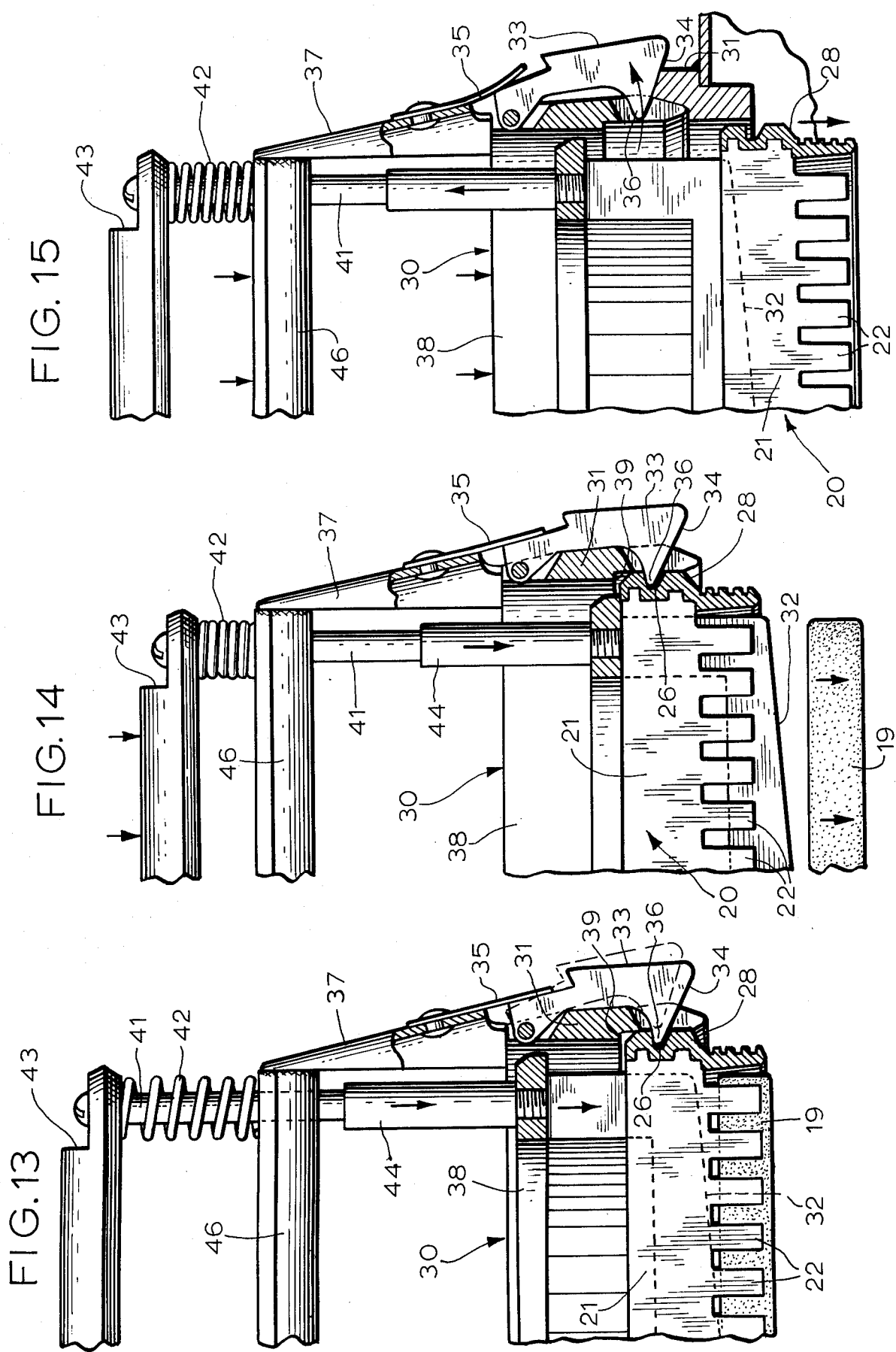

APPARATUS FOR HEATING FOOD PRODUCTS

This is a continuation-in-part of a patent application, Ser. No. 190,254, filed Oct. 18, 1971 now abandoned.

The present invention relates to a method and apparatus for heating food products, particularly proteinaceous food, such as hamburger patties. More particularly, the apparatus of the invention pertain to rapidly and efficiently cooking such products in fast food service restaurants.

BACKGROUND OF THE INVENTION

Depending on how they are cooked, hamburgers are a delicious, succulent food, and as a result, many restaurants all across the country specialize in serving this singular menu item. It is well known that the ingredients which contribute to the unique taste of hamburger are the fats and meat juices. Beef tallow, however, has a relatively low solidification point within the range of 88°–100° F. and, therefore, hamburgers are preferably formed into relatively thick patties and cooked at relatively low temperatures to prevent the tasty fats and meat juices from being melted or boiled away. Nonetheless, for reasons explained more fully hereinafter, fast food restaurants have found it commercially expedient to use relatively thin patties and cook them at relatively high temperatures in order to reduce the preparation time.

At the present time there are a wide variety of fast good restaurants which sell hamburgers and similar food items. Necessary to the success of such fast food operations is the ability to rapidly cook, garnish and serve hamburgers. Hamberger meat, however, it has become an accepted practice in the fast food industry to roll or press hamburgers into relatively thin patties, usually less than one-fourth inch, in order to decrease the amount of time necessary to cook them thoroughly. In particular, it has been found that by reducing the thickness of the hamburger patties, the distance the heat must travel through each patty is reduced, thereby reducing the amount of time necessary to cook the meat.

Though tastes differ, in general, the interior of a hamburger patty must be heated to a temperature of 160° F. before it is considered sufficiently done. To rapidly achieve this interior temperature, the exterior surfaces of the hamburger patty are subjected to relatively high temperatures, generally between 325° and 600° F. For example, the interior of a hamburger patty having a thickness of one-fourth inch can be heated to the desired temperature of 160° F. by exposing each side to temperatures of about 350° for 60 to 75 seconds. Establishments which cook hamburgers in this manner sometimes utilize an open griddle which is operated by at least one attendant. As such, a relatively large amount of heat energy and a relatively large amount of manpower is required to prepare hamburgers in manner.

During cooking on an open grill, however, there is a tendency for the hamburger patty to crawl together, shrink in diameter, and become thick in the center. This not only creates an undesirable appearance, it also creates cooking problems because the increased thickness requires higher temperatures, longer cooking time, or both. Increasing the cooking conditions tend to reduce the amount of fat and juices in the patty so that there not only a weight loss, but the product also tends to have a dry taste.

A popular alternative to the grill method of preparing hamburgers is the use of filed on broiler having heating elements inside a cabinet or hotbox. A chain conveyor carries the hamburger patties through the hotbox, and by adjusting the speed of the conveyor, the thickness of the hamburger patties, and the temperature of the heating elements, the hamburger patties can be rapidly cooked to the desired temperatures with minimal supervision. The temperatures of the heaters used in hotboxes of the type described varies between 350° and 700° F., but since the heaters can be disposed above and below the chain conveyor, the hamburger can be heated on both sides simultaneously, or consecutively. As a result, hamburgers are cooked by the broiler method in approximately half of the time normally required by the grill method, and with a minimal amount of manpower.

Though the broiler method of cooking hamburger is successfully used in fast food restaurant operations, it is also subject to numerous drawbacks. There are a number of variable conditions in the broiler which as a practicable matter must remain fixed; namely, speed of the conveyor and the temperatures of the heaters; and this has disadvantages. For example, it is commercially impracticable to cook hamburgers of both thin one-fourth inch and thick three-fourth inch sizes by the broiler method because that necessitates changing cooking conditions which is impracticable.

Most importantly, both the grill method and the broiler method of cooking hamburgers rely on the relatively slow process of heat conduction through the hamburger patty itself. Thus, while one must wait for the interior of the hamburger patty to reach the desired 160° F. even with a thin one-fourth inch thick patty, the exterior portions are being directly exposed to relatively high temperatures for up to 75 seconds. During this period of time, the fats and meat juices located near the more exterior portions of the hamburger patty are melted or boiled away, causing a noticeable loss of taste. In addition, a substantial amount of shrinkage results, a factor of increasing importance in an era of burgeoning meat prices.

For all these reasons, the hamburger prepared in fast food operations in often characterized by relatively thin, shriveled patties having a bland taste. In contrast to the hamburgers prepared in fast food restaurants, the hamburgers prepared in the home, where high speed preparation is not of the essence, are often thicker, juicier, and tastier. The primary reason for this difference is that hamburgers prepared at home can be cooked slowly at temperatures not in excess of 250° F. The relatively long period of time required to produce such a product is wholly impractical for fast food operations, and therefore, a compromise in taste and thickness must be made.

THE OBJECTS OF THE INVENTION

It is a primary object of this invention to provide an improved apparatus for rapid, efficient, and economical heating of food products, such as hamburger patties, as may be performed in fast food service restaurants.

It is another object of this invention to provide an appliance for promoting the rapid cooking of food products of the type normally shaped into patties.

It is a further object of this invention to provide a mobile appliance for impaling and holding a quantity of food, and carrying said quantity of food through a broiler.

It is an important object of this invention to provide means for rapidly heating a quantity of proteinaceous food, particularly hamburgers, with a minimal loss of meat juices and fats.

It is still another object of this invention to provide an apparatus for cooking proteinaceous food, particularly hamburgers, with a minimal amount of shrinkage.

It is still a further object of this invention to provide an apparatus for rapidly cooking proteinaceous food, particularly hamburgers, with a minimal amount of heat energy.

A still further object of this invention is to provide improved means for rapidly, and substantially uniformly, transferring heat throughout the interior of a quantity of food, particularly hamburgers.

Still another object of this invention is to provide improved means for rapidly cooking a relatively thick hamburger patty with as minimal amount of heat energy.

Still another object of this invention is to provide an appliance, having a plurality of projecting grills extending therefrom, for impaling and holding a quantity of proteinaceous food, and carrying said quantity of food through a broiler, and passing heat substantially uniformly from the broiler, through the projecting grills, to the interior of the food impaled and held thereon.

Still another object of this invention is to provide an improved apparatus for removing a quantity of food impaled and held on an appliance.

Still another object of this invention is to provide an improved apparatus for engaging and disengaging a hot appliance, having a plurality of projections extending therefrom, used for impaling and holding a quantity of food.

Still another object of this invention is to provide an improved means for cooking proteinacous food, particularly hamburgers.

Still another object of this invention is to provide an improved means for carrying food through a broiler.

Still another object of this invention is to provide an improved means for rapidly cooking a quantity of proteinaceous food.

Other objects, features and advantages of this invention will become apparent upon reading the following detailed description in conjuction with the accompanying drawings.

A BRIEF DESCRIPTION OF DRAWINGS

FIG. 10 is a reduced sectional view, taken along lines 10—10 of FIG. 4.

FIG. 11 is an enlarged sectional view, taken along lines 11—11 shown in FIG. 4.

FIG. 12 is a sectional view taken along lines 12—12 shown in FIG. 11.

FIG. 13 is an elevational view of the appliance showing a quantity of food impaled and held thereon, and further showing picker, operating in conjuction with the appliance, for removing the quantity of food impaled and held on the appliance.

FIG. 14 represents the same view illustrated by FIG. 13 except it depicts the appliance in complete cooperation with the picker.

FIG. 15 represents the same views illustrated by FIGS. 13 and 14 except that the picker is shown to be disengaged from the appliance.

DESCRIPTION OF AN EXEMPLARY EMBODIMENTS OF THE INVENTION

The apparatus and method of the invention permit the rapid cooking of thick, tasty hamburgers, of the type capable of being prepared in the home, with a minimal amount of heat energy, shrinkage and manpower. Briefly stated, the invention utilizes a cooking appliance having a plurality of parallely spaced heat transferring fins, each of which have a plurality of projecting grills of substantially uniform cross-section. A food item to be cooked, such as hamburger patty, is impaled and held on the projecting grills during the cooking operation. Heat from any suitable source can be passed through the fins and the projecting grills, for substantially uniform distribution throughout the interior of the hamburger patty itself.

The appliance of the invention is mobile, easily handled, and readily passed through a cooking environment so as to cook the hamburger patty with minimal manpower. As a result, a hamburger patty can be heated to desired temperatures in much less time than is required by conventional means. Alternatively, a hamburger of much greater thickness, including those up to three-fourth inch thick, can be cooked in approximately the same time it takes to cook a one-fourth inch hamburger patty by conventional methods. In either situation, the exterior portions of the patty will not by subjected to a relatively large amount of heat for a relatively long period of time, thereby reducing the amount of fat and meat juices that are ordinarily melted or boiled away. This, in turn, greatly reduces the amount of shrinkage. Additionally, less heat energy will be required to cook the same amount of hamburger meat. The apparatus is capable of producing a thicker, tastier hamburger in reduced time, while simultaneously providing great savings in both meat and energy.

The invention further includes a device for removing the hamburger from the appliance. The device has a plurality of spaced ribs, adapted to fit over the appliance in order to remove the hamburger therefrom. The ribs are aligned so that they can be passed between the heat transfer fins of the appliance, and into forceful contact with the hamburger patty impaled and held on the projecting grills. In this manner, the parallel ribs can be used to force the hamburger patty off of the appliance, as when cooking has been completed.

The device has a handle and further includes a latch which is adapted to releasably engage the appliance when the device is placed place against the appliance. This enables the attendant to move the appliance about, even after the impaled hamburger patty has been heated, and might otherwise be too hot to handle. The invention further includes means, in the form of a specifically constructed ring, for disengaging the latch, and thereby releasing the appliance from the device.

Figure 1:
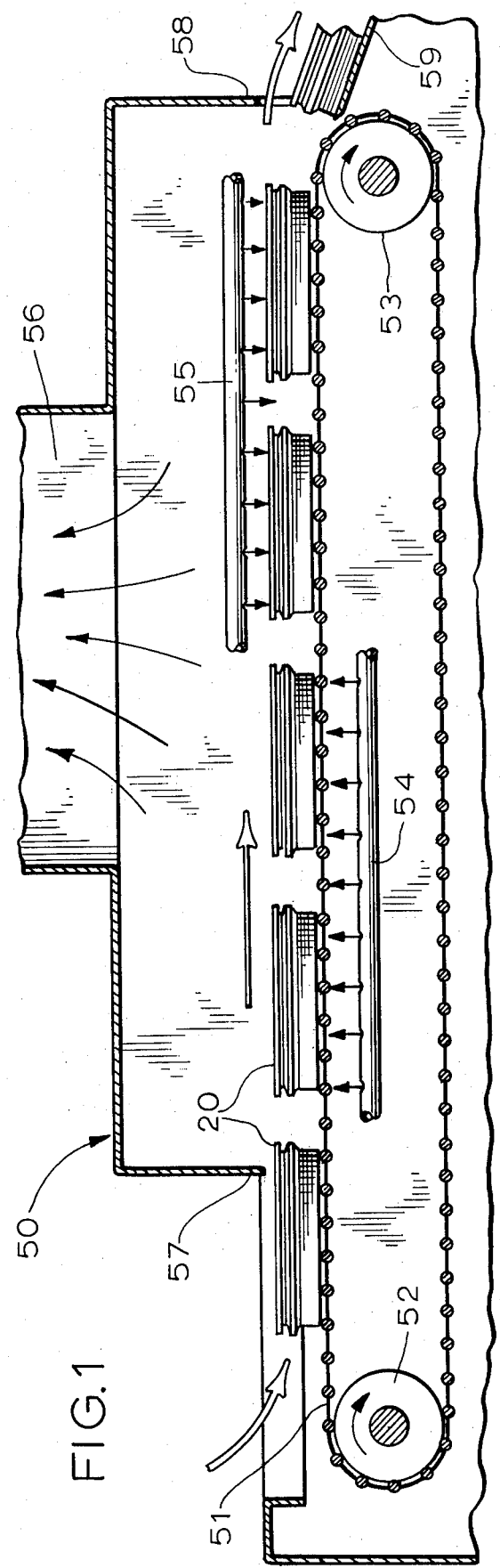
FIG. 1 is a fragmented elevational view of a conveyor carrying the apparatus of the invention through a broiler.

Referring now tto FIG. 1, a chain conveyor 51, supported by a pair of rollers 52 and 53 is depicted passing through the cooking environment which may be a broiler denoted generally by the reference numeral 50. An appliance 20, described in greater detail hereinafter, carries a quantity of food to be heated through the cooking environment 50. Appliance 20 is specifically adapted to carry hamburger patties, though it can hold a wide variety of food items. As shown, somewhat schematically in FIG. 1, the appliance carrying the particular food items to be heated enters broiler 50 at an inlet 57 and proceeds past heater 54 and 55 to an outlet 58. A ramp 59, disposed at outlet 58, carries the appliance and the heated items off of conveyor 51 and passes them to a garnish table (shown in FIG. 16). Broiler 50 is further provided with an exhaust port 56 to permit the escape of hot gases produced during the cooking process.

Heaters 55 and 54 are respectively disposed above and below conveyor 51, and as explained in more detail hereinafter, provide heat energy to appliances 20 as they are conveyed through broiler 50. Appliances 20, in turn, transfer heat substantially uniformly throughout the hamburger patty impaled and held thereon. The manner in which this heat transfer occurs can be seen best with reference to FIGS. 2–9. As shown most clearly in FIG. 4, appliance 20 includes a cylindrical housing 28 having an annular exterior groove 26 best illustrated in FIGS. 2, 3, and 6. Housing 28 further includes a pair of parallel spaced interior annular grooves 23, the purpose thereof to be explained immediately below. Extending downwardly from housing 28 is an integral cylindrical lip 25.

Figure 4:
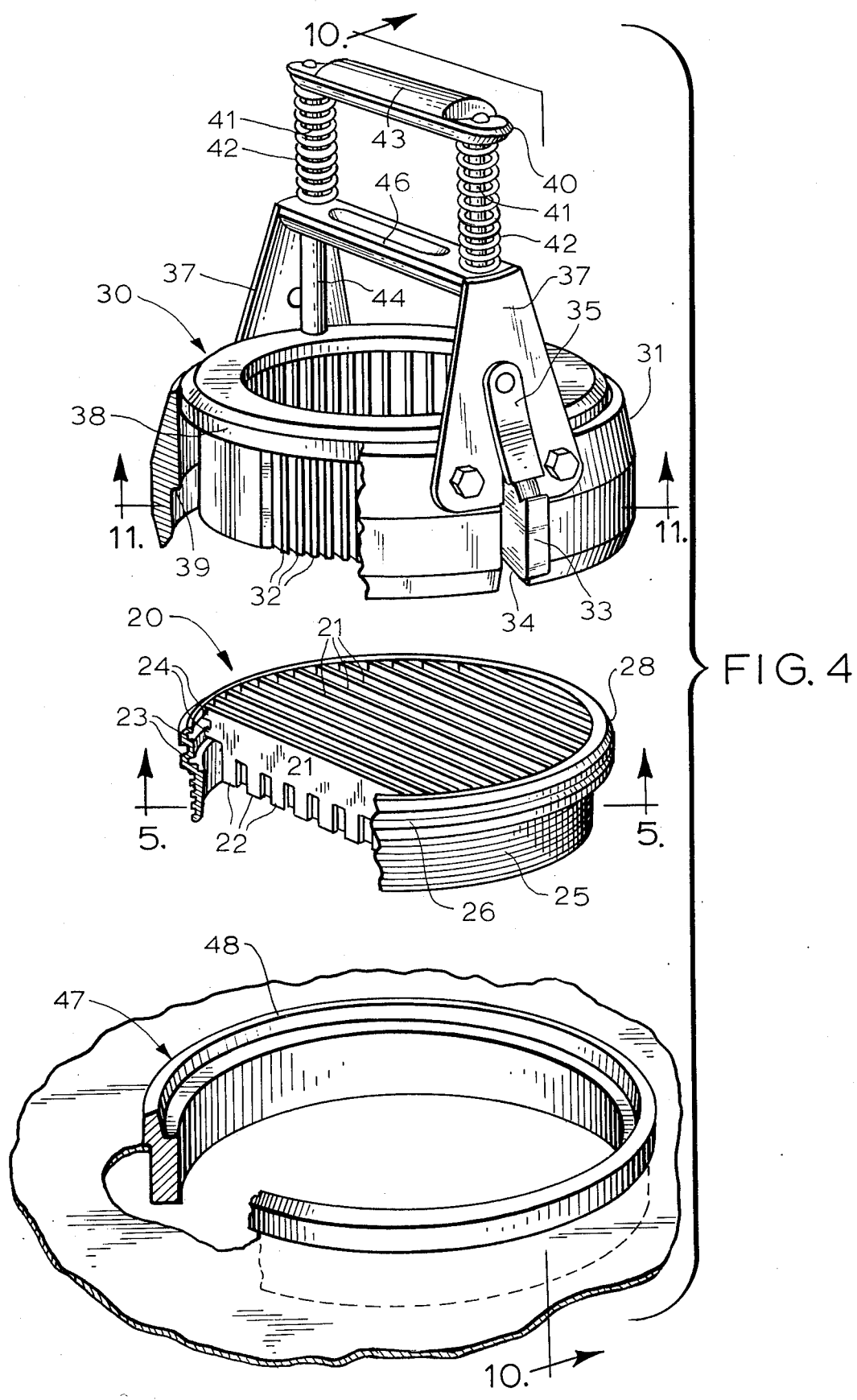
FIG. 4 is an enlarged perspective view of an appliance in spaced relationship with a picker used for removing a quantity of food that may be held by the appliance, and in further spaced relationship with means for disengaging the appliance from the picker after the picker has been fastened to the appliance.

Heat transfer means in the form of a plurality of heat conducting fins 21 are supported by the housing in spaced rows. The fins are secured to housing 28 by a pair of tabs 24 extending from each end of each of fins 21. Tabs 24 fit within the interior annular grooves 23 and are secured to housing 28 as by suitable means. As shown in FIG. 4, fins 21 are disposed in parallely spaced relationship from about one-eight inch to about one-fourth inch apart. Extending downwardly from each of fins 21 are a plurality of projecting grills 22 of substantially rectangular configuration. The projecting grills 22 associated with each fin 21 are also spaced apart from about one-eight inch to about one-fourth inch. Additionally, the projecting grills 22 are alternately spaced relative to each other in order to provide an array of heating surfaces for cooking the hamburgers internally.

Figure 3:
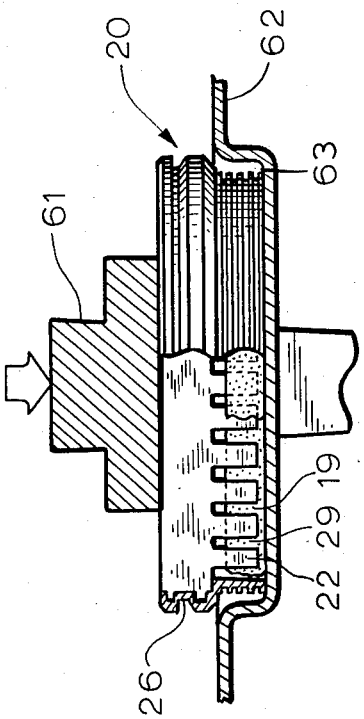
FIG. 3 is a sectional view taken along lines 3—3 of FIG. 2 showing the apparatus of the invention impaling and holding a quantity of food.
Figure 2:
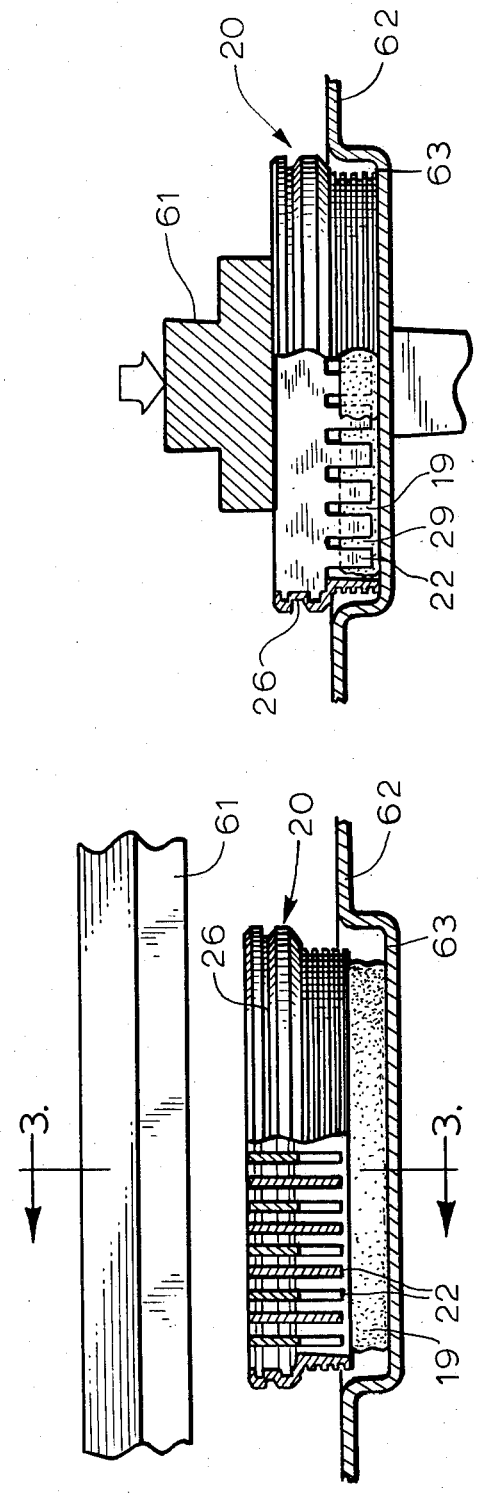
FIG. 2 is an enlarged elevational view of the appratus of the invention and a quantity of food.
Figure 6:
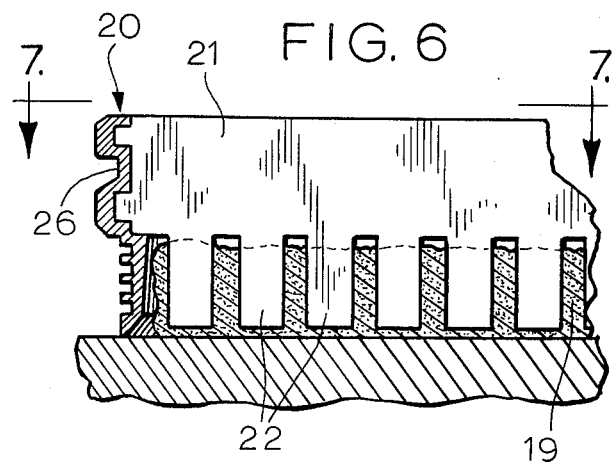
FIG. 6 is an enlarged fragmented view, taken in section, along lines 6—6 shown in FIG. 5.

The projecting grills 22 in appliance 20 are adapted to impale and hold a quantity of proteinaceous food, such as a hamburger patty 19. A hamburger patty may be impaled on the grills 22 by a press as shown in FIGS. 2 and 3. The hamburger patty 19 is placed in a recess 63 of a preparation tray 62. Appliance 20, with projecting grills 22 extending downwardly, is placed on top of hamburger patty 19, and a press 61 is then lowered onto appliance 20, forcing projecting grills 22 into the top side of hamburger 19. As shown in FIG. 6, projecting grills 22 extend from the top side at least about adjacent the other side of hamburger patty 19.

Figure 5:
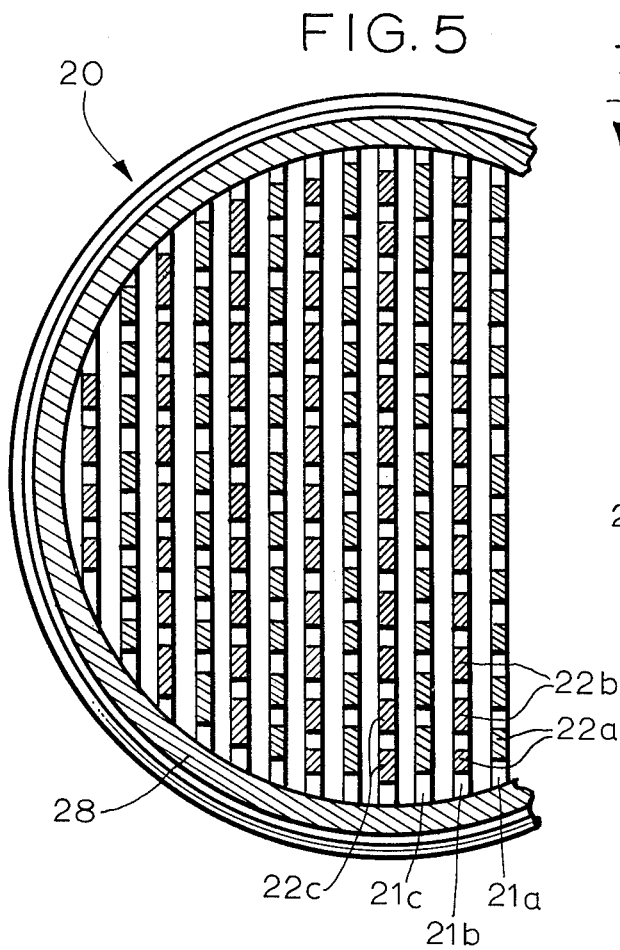
FIG. 5 is an enlarged fragmented view, taken in section, along lines 5—5 shown in FIG. 4.
Figure 7:
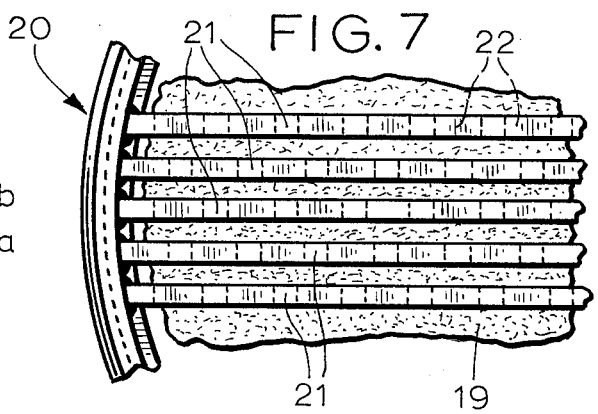
FIG. 7 is a fragmented, sectional view, taken along lines 7—7 shown in FIG. 6.
Figure 8:
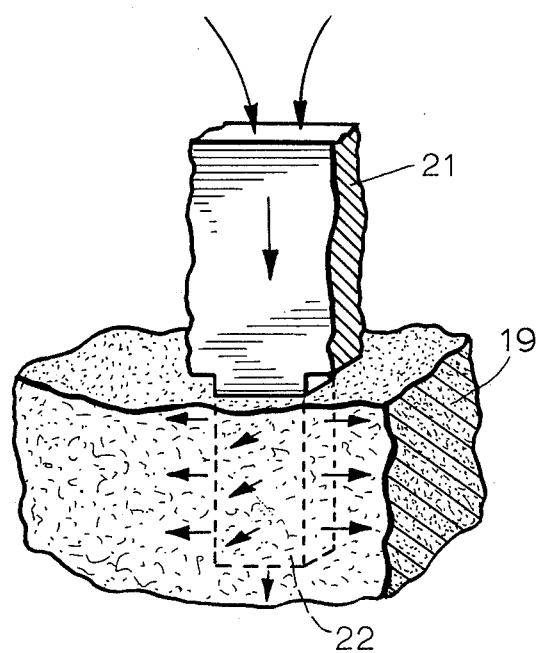
FIG. 8 is a greatly enlarged, fragmented, perspective view of a single one of the projecting grills extending from the appliance, showing a quantity of food impaled and held thereon.

The array formed by projecting grills 22 is shown in greatest detail in FIGS. 5, 7 and 19. Referring to FIG. 5, for example, several rows of heat conducting fins are shown including fins 21a, 21b and 21c. Also shown are projecting grills 22a, 22b and 22c, associated with fins 21a, 21b and 21c, respectively. The projecting grills 21b associated with fin 21b are alternately spaced relative to projecting grills 22a and 22c associated with adjacent fins 21a and 21c, respectively. It should be clear, however that although the drawings illustrate the projecting grills alternately spaced relative to the projecting grills extending from any adjacent and opposite fin, other arrangements of grills may be used to achieve equal spacing of the food from surfaces of the grills.

Figure 9:
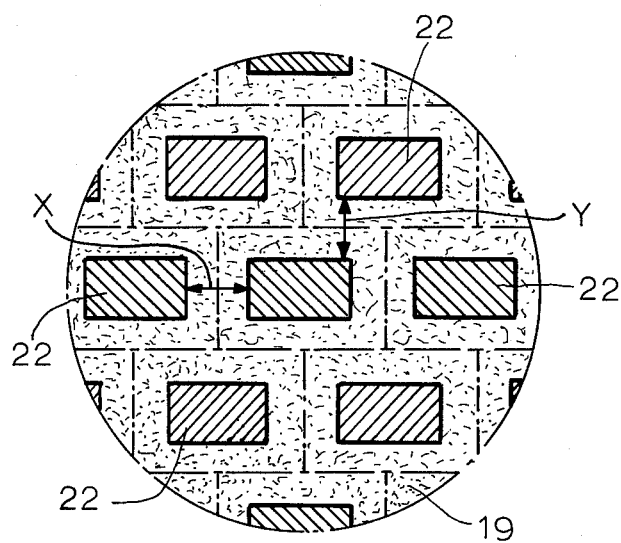
FIG. 9 is a greatly enlarged plan view of a portion of the underside of the appliance showing a plurality of projecting grills impaling and holding a quantity of food, and further showing the spaced relationship of the projecting grills.

The position of projecting grills 22 relative to the hamburger patty impaled and held thereon is best seen by referring to FIGS. 7 and 9, particularly FIG. 9. More particularly, the horizontal spacing between the projecting grills 22 associated with any heat conducting fin 21 is represented by a distance X. Similarly, the vertical distance between any adjacent heat conducting fin is equal to the distance Y. As mentioned hereinabove, the distances represented by both X and Y are in the range from about one-fourth inch to about one-eight inch, and usually about three-sixteenth inch. Accordingly, no point within hamburger patty 19 is further than about one-eight inch from a projecting grill. It follows, tht the heat energy received in the broiler, and passed from the heat conducting fins 21 to projecting grills 22, need only travel a maximum distance of about one-eight inch to about one-sixteenth inch through the hamburger patty 19. This heat transfer from the fins 21 to grill 22 and into the hamburger 19 is represented by the arrows in FIG. 8.

Since the projecting grills 22 are of substantially uniform cross-section, the heat radiated therefrom is substantially uniformly transferred throughout the hamburger patty to be heated to the desired temperature of 160° F. at a relatively fast rate. Additionally, the desired interior temperature can be reached without having to expose the more exterior portions of the hamburger to high temperatures for a relatively long period of time. As result, the meat juices and fats in the more exterior portions of the hamburger will not be as readily boiled or melted away in course of heating the interior portion as is the case in more conventional fast food operations. Since heat is conducted to the interior of the hamburger through the high conductivity projecting grills rather than through the meat itself, it should also be observed that rapid interior heating will occur for any hamburger thickness, limited only by the length of projecting grills 22.

The invention also provides a device for removing the hamburger patty from the grills. Referring to FIGS. 4, 10, 11 and 12, an ejection device 30 is shown for separating the hamburger patty. Device 30 includes a circular frame 38 and an externally mounted, downwardly extending sleeve 31 in spaced relationship from frame 38. Sleeve 31 is adapted to fit downwardly over housing 28 and lip 25 of appliance 20 until the top of housing 28 contacts an annular abutment edge 39 integrated with the inside surface of sleeve 31 of device 30.

As shown best in FIG. 11, device includes a plurality of parallely spaced ribs 32 which are secured to frame 38. The bottom edges of ribs 32 are bowed convexly as illustrated in FIG. 10, and are adapted to pass through the spaces between fins 21 of appliance 20. As explained in more detail hereinafter, ribs 32, as they pass between fins 21, eventually contact the hamburger patty impaled on appliance 20, and push the hamburger patty off of the projecting grills 22.

Device 30 serves the additional function of releasably engaging appliance 20, as so to hold the two units together as a unitary assembly. This has several advantages. Upon engagement with device 30, for example, appliance 20 can be manually and conveniently moved about without danger of buring an attendant's hand. Moreover, the appliance 20 can be held immediately above a bun, and the hamburger ejected directly thereon.

The releasable engagement of device 30 with applicance 20 is accomplished by opposed latches 33 pivotably secured to sleeve 31. Each latch 33 hangs downwardly along the outer edge of sleeve 13, and has a beveled bottom edge 34 terminating in hook 36.

Still referring to FIGS. 4 and 10, a support 37 is fastened between sleeve 31 and a lower handle 46 which extends above the diameter of frame 38 of device 30. Attached to support 37 is a leaf spring 35 which overlies latch 33, urging hook 36 toward sleeve 31. When device 30 is lowered onto appliance 20, however, the top edge of circular housing 28 contacts beveled edge 34 of latch 33 forcing latch 33 away from sleeve 31 of picker 30. as device 30 is further fit onto appliance 20, abutment edge 39 of device 30 contacts the top edge of housing 28 of appliance 20, thus preventing device 30 from sliding completely through appliance 20. At the same time, latch 33 slides along the edge of housing 28 until hook 36 engages annular groove 26 in housing 28. As a result of the engagement of hook 36 with annular groove 26, device 30 becomes fastened to appliance 20. This enables device 20, even though relatively hot after emerging from the broiler, to be removed about simply by moving device 30 which, having not passed through broiler, is at room temperature.

Device 30 further includes a standard 44 secured to the top of frame 38 and extending upwardly therefrom, terminating in lower handle 46. A plunger 41 is seucred inside standard 44 and extends upwardly from top surface of housing 38, through lower handle 46, to an upper handle 46. A coiled spring 44 surrounds plunger 41 between lower handle 46 and upper handle 43.

Referring now to FIGS. 13 through 15, it should be observed that handles 46 and 43 are adapted to be manually forced together by applying pressure against coiled spring 42. When this occurs, plunger 41 is moved downwardly through standard 44, exerting a force against frame 38. Frame 38 is thus moved downwardly relative to sleeve 31, causing ribs 32 to pass through the spaces between parallely spaced fins 21 of appliance 20. As ribs 32 continue to move downwardly, the are brought into forceful contact with the hamburger patty 19 impaled and held on projecting grills 22.

As shown in FIG. 14, when upper handle 43 and lower handle 43 force coiled spring 42 into maximum compression, ribs 32 of picker 30 extend completely through fins 21 of appliance 20, thereby freeing hamburger 19. Thereafter, as shown in FIG. 15, the manual force exerted on upper handle 43 and lower handle 46 can be relaxed, permitting coiled spring 42 to urge plunger 41 in an upward direction. Consequently, frame 38 moves upwardly relative to sleeve 31, causing ribs 32 to retract to their original position shown in FIG. 13.

Referring again to FIG. 4, a ring 47 having a protruding annular top edge 48 is shown. The function of ring 47 is to disengage the device 30 from appliance 20. This is accomplished by urging hook 36 (FIG. 10) of latch 33 out of emgagement which annular groove 26 of appliance 20. More particularly, when device 30, having appliance 20 engaged therewith, is lowered onto ring 47, annular edge 48 is forced against beveled edge 34 of latch 33. When this occurs, latch 33 is moved outwardly against the force of leaf spring 35, thereby freeing hook 36 from annular groove 26. As a result, picker 30 can then be lifted upwardly, out of engagement with appliance 20, leaving appliance 20 and ring 47 in place.

Figure 16:
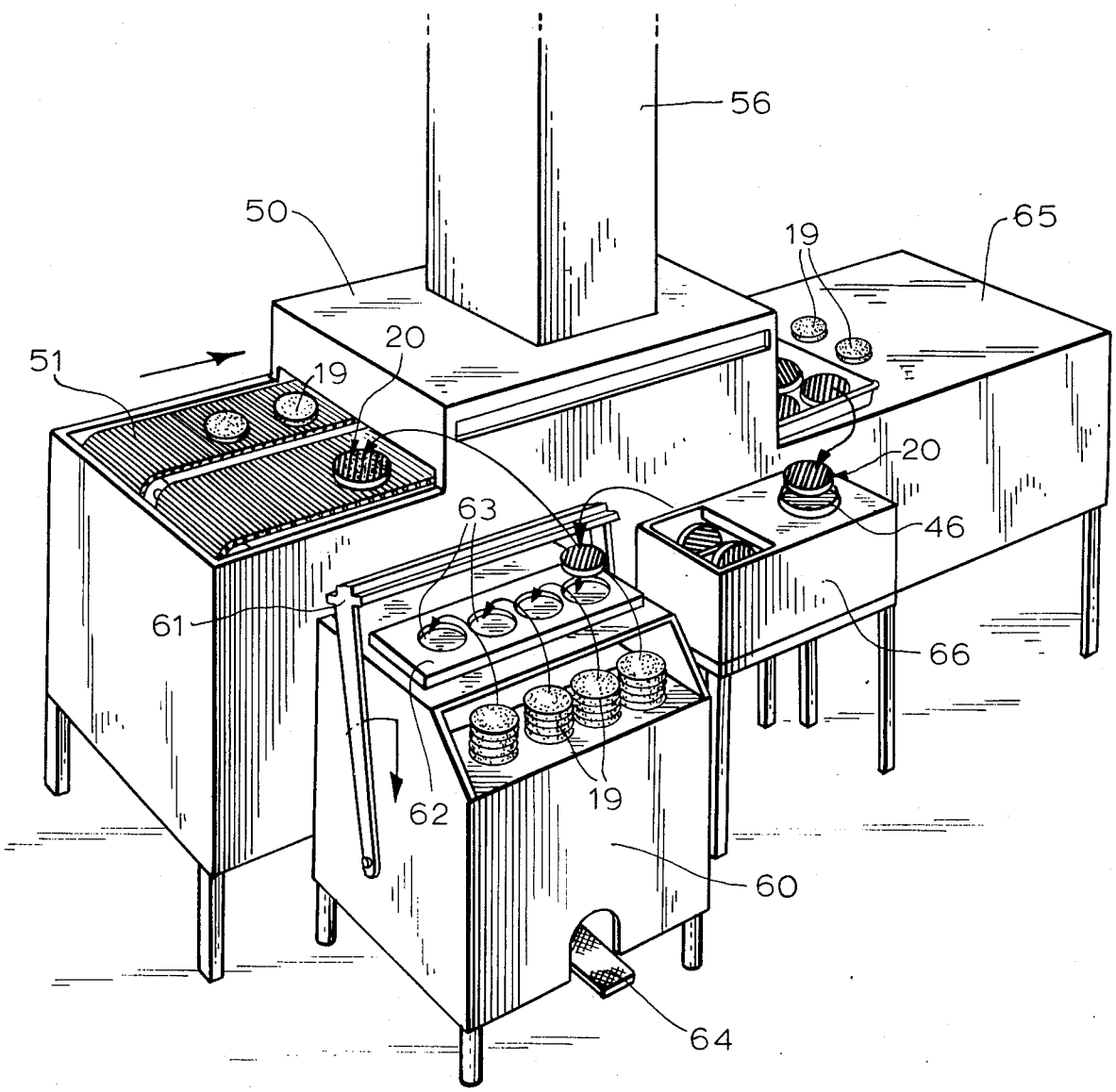
FIG. 16 is a perspective view of a conveyor, broiler, garnish table, and various other stations that may typically be used in practicing the method and apparatus of the invention.

The manner in which the apparatus of the invention can be used in a practical fast food restaurant is shown in FIG. 16. A separation table 60, a chain conveyor 51, a broiler 50 having an exhaust port 56, a garnish table 65, and a sterilization table 66 are shown. At preparation table 60, a supply of uncooked proteinaceous food, for instance raw hamburger patties, is provided. As explained with reference to FIGS. 2 and 3, hamburger patties 19 are placed in a recess 63 of a preparation tray 62, and an appliance 20 is placed on top of each patty. A press 61, actuated in the present embodiment by a foot pedal 64, then pushes the projecting grills of appliances 20 into hamburger patties 19.

Hamburger patties 19, carried by appliances 20, are then placed on chain conveyor 51 which passes through broiler 50 as shown in FIG. 1. Inside the broiler, heat is conducted through appliances 20 to the interior of hamburger patties 19, cooking them to the temperature desired. Since, with the aid of appliances 20, heat is conducted throughout the interior of hamburger patties 19 much faster than by the conventional methods hereinabove described, the conveyor speed can be greatly increased. For example, hamburger pattly one forth inch thich can be cooled in about 30 seconds instead of the usual 60 seconds.

At the outlet of broiler 50, the cooked hamburger patties 19 with the appliances 20 still impaled therein, are passed to garnish table 65. In a manner hereinabove described, device 30 is used to engage the hot appliance 20 with the cooked hamburger patties 19 thereon, and the patty is discharged from the appliance operation handle 46 as previously described. Appliance 20, still attached to device 30, is subsequently carried to a sterilization tank 66, where ring 46 is used to disengage appliance 20 from device 30, so that the appliance drops into a sterilization bath in the tank. Appliance then can be sterilized, and subsequently reused with a new batch of raw hamburger patties delivered to preparation table 60, and device 30 can be returned to garnish table 65.

In view of the foregoing, it should be clear that the method and apparatus of the invention permit the rapid efficient cooking of hamburger patties and other proteinaceous food products. This is done with minimal shrinkage, heat energy, and manpower. More importantly, cooking is accomplished without melting or boiling away large amounts of fats and meat juices, thereby producing a thick, tasty product.

The invention not only tends to reduce weight losses, but the plurality of grills which impale the hamburger patty also reduce shrinkage in the outside dimensions of the product by keeping the areas of the patty physically separated during the cooking operation. For this reason, the outside dimensional sizes of the patty emerging from the cooking operation are only slightly less than the uncooked patty. This not only is important from the standpoint of appearance, but is also related to cooking efficiency.

Moveover, the plurality of grills in the appliance reduce the possibility of over-charing or burned surfaces which may otherwise arise from very high temperatures.

The invention further allows greater flexibility in cooking that possible heretofore in fast service restaurants. Not only can a wide variety of sizes and shapes be cooked rapidly, but a wide variety of different products can be cooked rapidly without altering the cooking environment.

From the foregoing, it should also be apparent that numerous variations of the embodiment disclosed and described herein can be devised without departing from the true scope of the invention. Accordingly, the invention should not be limited to the specific embodiments disclosed, but should be given the pervasive coverage defined in the appended claims.

I claim:
1. An appliance for heating a food patty, and which is adapted to cook ground meat, comprising:
   a plurality of projecting grill means mounted in an array for insertion into one side of such food patty;
   said projecting grill means being of sufficient length to penetrate such food patty from the one side to at least about adjacent the opposite side of such patty;
   a plurality of heat transfer fin means thermally connected to said plurality of grill means so that substantial amounts of the heat energy imparted thereto are transmitted to said grill means so as to heat the food patty internally; and
   ejection means adapted to be associated with said projecting grill means for removing the food patty from the grill means following the cooking operation.
2. The appliance of claim 1 wherein said grill means are positioned in said array so that substantially completely all the food in the patty is spaced a short distance from said plurality of grill means.
3. The appliance of claim 2 wherein said projecting grill means are mounted in substantially parallel rows.
4. The appliance of claim 3 wherein each of said projecting grill means has substantially rectangular configuration.
5. An appliance for heating a food patty, and which is adapted to cook ground meat, comprising:
   a plurality of projecting grill means formed of heat conducting material of a length sufficient for penetrating the patty from one side to at least about adjacent the opposite side;
   means for pressing the patty onto the projecting grill means while retaining the desired patty shape;
   ejection means adapted to be associated with said projecting grill means for removing the patty from said projecting grill means; and
   means for effecting relative movement between the ejection means and said projecting grill means.
6. The appliance of claim 5 wherein said projecting grill means are disposed and positioned in an array so that substantially completely all the food contained within the patty is spaced substantially equidistant from the surfaces of said plurality of grill means after said grill means has been completely inserted into the one side of the patty.
7. The appliance of claim 6 wherein said ejection means comprise spaced ribs which fit between said projecting grill means
8. The appliance of claim 7 with the addition of a plurality of heat transfer fin means thermally connected to said plurality of grill means so that substantial amounts of heat energy imparted thereto are transmitted to said grill means so as to heat the food patty internally.
9. In association with a cooking appliance, a device for removing a food article from the cooking appliance, said device being adapted to remove a food patty from projecting cooking elements on which the patty is impaled in the cooking appliance, comprising:
   a plurality of members adapted to be associated with the projecting cooking elements and adapted to fit between the projecting cooking elements; and
   means for effecting relative movement between the projecting cooking elements and the members so that the food article is stripped from the projecting cooking elements on which the food is impaled.
10. The device of claim 9 wherein the plurality of members comprise spaced ribs.

* * * * *

UNITED STATES PATENT OFFICE
CERTIFICATE OF CORRECTION

Patent No. 3,996,847        Dated December 14, 1976

Inventor(s) Claude A. Reed

It is certified that error appears in the above-identified patent and that said Letters Patent are hereby corrected as shown below:

Column 2, lin2, delete "filed on" and insert -- a --.

Column 5, line 13, delete "place."

Column 5, line 31, "heater" should be -- heaters --.

Column 8, line 28, "separation" should be -- preparation --.

Column 8, line 49, "forth" should be -- fourth --.

Column 8, line 49, "thich" should be -- thick --.

Column 8, line 49, "cooled" should be -- cooked --.

Signed and Sealed this thirtieth Day of August 1977

[SEAL]

Attest:

RUTH C. MASON
*Attesting Officer*

C. MARSHALL DANN
*Commissioner of Patents and Trademarks*